United States Patent [19]

Oman et al.

[11] Patent Number: 5,392,033

[45] Date of Patent: Feb. 21, 1995

[54] PRIORITY GENERATOR FOR PROVIDING CONTROLLABLE GUARANTEED FAIRNESS IN ACCESSING A SHARED BUS

[75] Inventors: Price W. Oman, Raleigh; Andrew J. Rindos, III, Durham, both of N.C.

[73] Assignee: International Business Machines Corporation, Armonk, N.Y.

[21] Appl. No.: 759

[22] Filed: Jan. 5, 1993

[51] Int. Cl.6 .............................................. H04Q 1/18
[52] U.S. Cl. .............................. 340/825.5; 370/85.13; 370/85.6
[58] Field of Search ........................ 340/825.5, 825.51; 370/85.2, 85.6, 85.13, 85.14

[56] References Cited

U.S. PATENT DOCUMENTS

| | | | |
|---|---|---|---|
| 4,620,278 | 10/1986 | Ellsworth et al. | 364/200 |
| 4,670,872 | 6/1987 | Cordill | 340/825.51 |
| 4,814,974 | 3/1989 | Narayanan et al. | 340/825.51 |
| 4,855,905 | 8/1989 | Estrada et al. | 364/200 |
| 4,884,228 | 11/1989 | Stanley et al. | 364/200 |
| 5,124,981 | 6/1992 | Golding | 340/825.5 |
| 5,128,937 | 7/1992 | Khalil | 340/825.5 |
| 5,268,902 | 12/1993 | Onozaki | 340/825.5 |
| 5,274,631 | 12/1993 | Bhardwaj | 370/85.13 |
| 5,281,963 | 1/1994 | Ishikawa et al. | 340/825.5 |

OTHER PUBLICATIONS

L. Zhang, "Virtual Clock: A New Traffic Control Algorithm for Packet Switching Networks," in Proc. SIGCOMM '90, Philadelphia, Pa., Sep. 1990, pp. 19–29.
"Design and Analysis of Arbitration Protocols", IEEE Transactions on Computers, vol. 38, No. 2, Feb. 1989, pp. 161–171.
"Programmable Priority Mechanism", IBM Technical Disclosure Bulletin, vol. 17 No. 7, Dec., 1974.
"Bus Arbitration Selection Mechanism", IBM Technical Disclosure Bulletin, vol. 25, No. 11A, Apr. 1983.

Primary Examiner—Donald J. Yusko
Assistant Examiner—Gregg V. Miller
Attorney, Agent, or Firm—Stephen T. Keohane; Geoffrey A. Mantooth

[57] ABSTRACT

A central arbiter uses priority generators to determine which resource on a shared bus has priority in accessing the bus. Each resource has a corresponding priority generator. Each priority generator has a counter having inputs and outputs. A starting value is provided at the inputs and the priority value is obtained from the outputs. Each priority generator has a comparator that compares the outputs of a counter with a modulo number of the counters, N. The priority generators provide a combination of fixed priority and round robin arbitration schemes. By selecting the value of N relative to the number of resources, the rate of round robin access relative to fixed priority access can be set.

11 Claims, 11 Drawing Sheets

PRIORITY GENERATOR FOR PROVIDING CONTROLLABLE GUARANTEED FAIRNESS IN ACCESSING A SHARED BUS

FIELD OF THE INVENTION

The present invention relates to data processing systems that have plural resources that transmit and receive data over a shared bus.

BACKGROUND OF THE INVENTION

In a data processing system, shared buses are used to interconnect plural resources together. For example, a data bus could be shared by various local area networks (LANs). The LANs transfer data between each other over the shared data bus.

Because of the potential of congestion that could arise with many resources using a single bus, some mechanism must be provided to control the trafficking of data over the bus. An arbiter prevents more than one resource from transmitting data on the bus at the same time. The arbiter also determines which particular resource gains access to the bus, typically on the basis of some priority scheme or protocol.

As discussed in Guibaly "Design and Analysis of Arbitration Protocols", *IEEE Transactions on Computers*, volume 38, number 2, February 1989, pages 161–171, the selection of an arbitration scheme is generally a choice between priority and fairness. In a priority based scheme, each resource has an assigned priority which determines the winning resource if two or more resources are competing for the bus. Fairness ensures that resources with the low priority will gain access to the bus without being completely locked out as could occur with heavy traffic over the bus.

Two fair arbitration protocols are round robin (or rotating) and first-come first-serve. Under a round robin arbitration scheme, the arbiter sequentially grants each resource access to the bus. No resource receives a second grant to the bus until all other resources have been given an opportunity to use the bus. Under a first-come first-serve arbitration scheme, resources are granted access to the bus in the order in which they requested it. Both of these schemes are very fair because each resource has a chance to access the bus. However, these schemes do not in general produce the best performance. Mean waiting time for the bus can be longer than is necessary. These schemes also cannot guarantee that certain critical resources will not wait longer than is allowable, with a resultant loss of data.

When priorities are assigned, access to the bus is granted among requesting resources according to their relative priority. No resource of a given priority may be serviced until all resources of a higher priority waiting for the bus have been served. Upon entering the queue for bus service, a resource is placed ahead of all resources with a priority lower than its own, and behind all resources with a priority higher than its own. Resources having equal priority may be served according to a first-come first-serve, round robin or some other priority scheme. If the arbitration scheme is non-preemptive, a resource first entering the queue will never interrupt the servicing of the resource that is using the bus, even if that resource has a lower priority. Under a preemptive scheme, the resource using the bus would be interrupted if a higher priority resource entered the queue.

Use of priorities can reduce system mean response times. Their use can also guarantee that those resources that cannot wait too long for servicing will receive it in a timely manner. Their use does introduce one drawback however. Low priority resources can be "shut out" from using the bus for unacceptably long periods of time.

Priority mechanisms are particularly important in systems used to transport isochronous data where guaranteed data bandwidth and low queuing delay are essential. Isochronous data, which may include voice, video, or other multimedia information, must be transported by the bus or other interconnection mechanism within fixed time constraints. An arbitration mechanism that provides an efficient means of allocating bus access is an essential part of isochronous and multimedia capable systems.

SUMMARY OF THE INVENTION

It is an object of the present invention to provide a priority generator that provides controllable guaranteed fairness in accessing a shared bus.

The method of the present invention generates priorities for plural resources in a data processing system. The plural resources share a common device. The method provides for each resource a counter having an input for receiving an input signal representative of a starting value into the counter. Each of the counters has an output for providing an output signal representative of an incremented value. An input signal representative of a starting value is loaded into each of the counters. The starting values of each counter is unique relative to the starting value of the other counters. The priority of each of the resources is determined from the incremented value. At predetermined intervals of time, all of the counters are incremented to provide output signals. When the output signal of each counter reaches a first predetermined value, then the output signal of that counter is reset to an output signal representative of a second predetermined value. The incrementing of all of the counters then continues at predetermined intervals of time.

In one aspect of the present invention, the method further comprises the step of providing that the first predetermined value is representative of the number of resources sharing the common device. In still another aspect of the present invention, the first predetermined value is representative of a number that is greater than the number of the resources sharing the common device.

The apparatus of the present invention generates priorities for plural resources in a data processing system. Each resource has a counter that has an input for receiving an input signal representative of a starting value into the counter. Each counter has an output for providing an output signal representative of an incremented value. Each of the counters has means for incrementing the respective counter. Each of the counters has means for determining when the output signal becomes representative of a first predetermined value and for producing a reset signal when the output signal becomes representative of the first predetermined value. The reset signal is applied to means for resetting the respective counter.

With the priority generators of the present invention, plural arbitration schemes or policies can be implemented with the same hardware. The present invention provides the following arbitration schemes: fixed priority, first-come first serve priority, round robin, and a combination of fixed priority and round robin. The desired arbitration scheme can be selected by programming the inputs of the priority generators.

The combination of fixed priority and round robin permits priorities for some resources, while guaranteeing fairness in access to other resources. The round robin portion of the combination implements the guaranteed fairness. The ratio of the amount of time spent in round robin to fixed priority is programmable.

BRIEF DESCRIPTION OF THE DRAWINGS

FIG. 5A shows the logic circuit for defining the transmitter adapter. FIG. 5B shows the logic circuit for defining the receiver adapter.

FIG. 7A shows the logic circuit for defining the receiver adapter. FIG. 7B shows the logic circuit for defining the transmitter adapter.

DESCRIPTION OF THE PREFERRED EMBODIMENT

Figure 1:
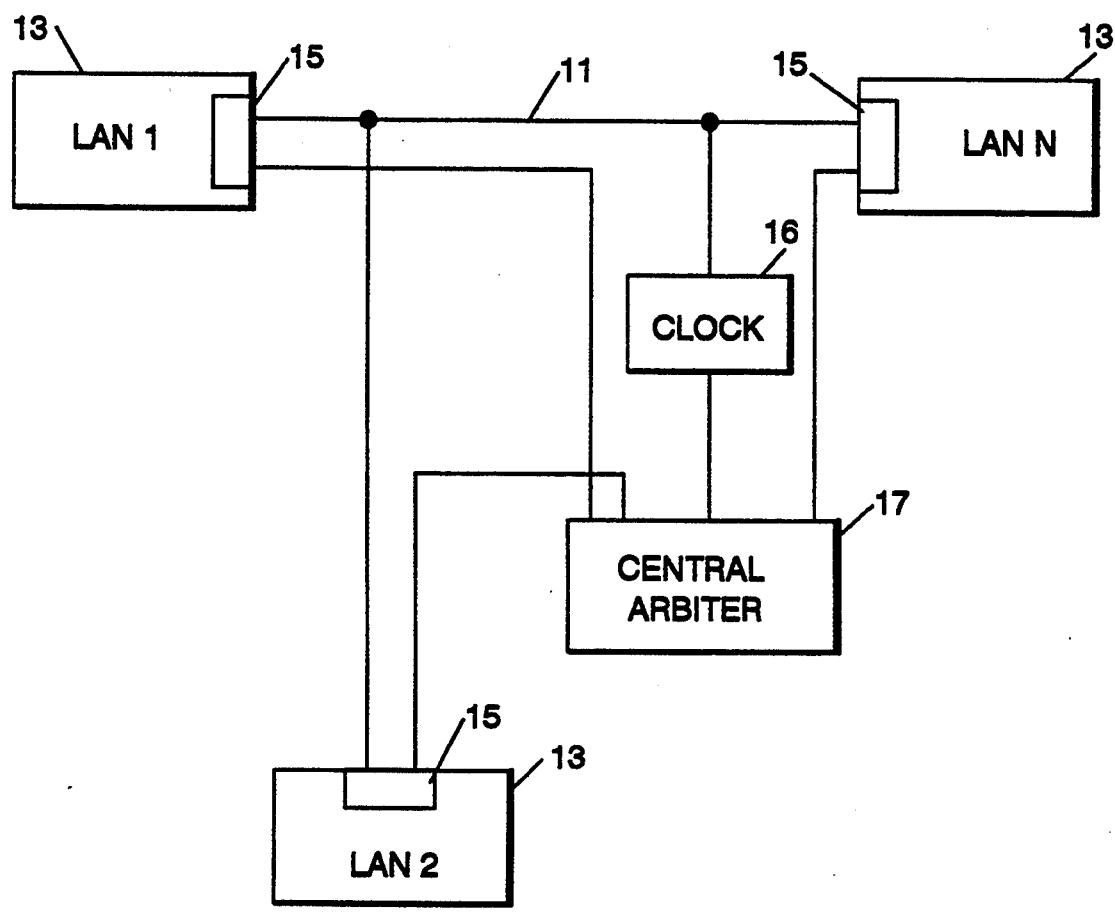
FIG. 1 is a block diagram showing a shared bus servicing plural resources, such as local area networks, along with the controller system of the present invention, in accordance with the present invention.

In FIG. 1, there is shown a block diagram of the controller system of the present invention, in accordance with a preferred embodiment. The controller system controls the flow of data over a high bandwidth bus 11. The bus 11 is utilized by plural resources 13, such as local area networks (LANs), to communicate with one another. The resources 13 are connected to the bus by way of adapters 15. For an n number of resources, there are n adapters.

The adapters 15 are typically the interface modules of a particular resource. Thus, for example, a first LAN would be connected to the bus by adapter #1, a second LAN would be connected to the bus by adapter #2 and so on until an nth LAN would be connected to the bus by adapter #n. The adapters allow the LANs to communicate with each other over the bus. A clock 16 is provided to synchronize all of the LANs and the controller system with each other.

The controller system of the present invention includes the adapters 15 and a central arbiter 17 connected to the adapters.

Figure 2:
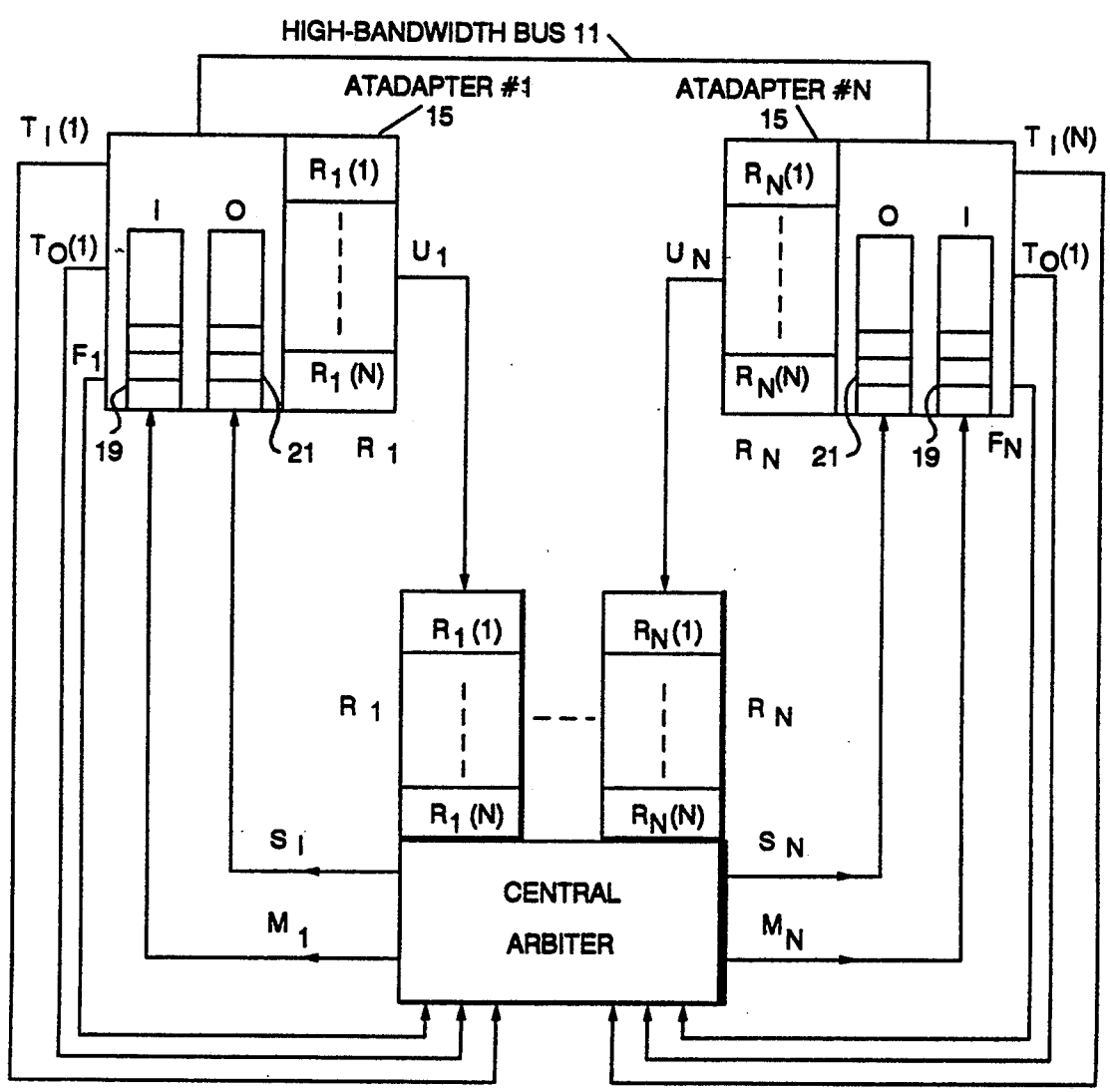
FIG. 2 is a block diagram showing a detailed view of the controller system.

Referring to FIG. 2, each adapter 15 has an input buffer 19 and an output buffer 21 that are connected to the bus 11. The input buffer receives data from the adapter's LAN. The adapter 15 transmits the data from its input buffer 19 onto the bus 11 to another adapter and LAN. The adapter receives data from the bus 11 into its output buffer 21. The adapter then outputs the data from the output buffer to its respective LAN. The input and the output buffers are connected to their resources by lines (not shown).

The central arbiter 17 controls the adapters 15 by determining which adapter can transmit data from its input buffer 19 onto the bus 11 and which adapter receives the transmitted data from the bus into its output buffer 21. Thus, the central arbiter maintains control of the flow of data along the bus.

In so controlling data flow along the bus, the controller system determines if an input buffer is almost full and if there exists an output buffer that will accept the data for the almost full input buffer. If such a set of input and output buffers exists, then the adapters containing those buffers are granted the buffer arbiter for gaining access to the bus. This minimizes the possibility of having an input buffer overflowing with data, a situation that leads to the loss of data due to the input buffer being filled beyond its capacity. If there is no almost full input buffer, then the controller system determines if an output buffer is nearly empty and if an input buffer exists with data for the nearly empty output buffer. If such a set of buffers exists, then the adapters containing those buffers are granted priority for gaining access to the bus. This maintains data in the output buffer so that the respective resource always has work to do (and is therefore working at capacity). If there is no nearly empty output buffer, then the controller system determines if there exists merely a non-full output buffer, that is an output buffer that can accept data. The non-full output buffer is matched with an input buffer having data targeted for that output buffer.

In the event that there is a tie at a level of priority (for example there are two sets of nearly full input buffers with data for non-full output buffers), then a buffer arbiter breaks the tie using predetermined priority inputs for the adapters. The priority inputs can be static or they can be dynamic, as in, for example, a rotating priority. Priority generators are used to produce the priority inputs. The rotating priority is based on the ability of the output buffers to empty and the input buffers to fill. The fastest buffers are allowed more opportunities to access the bus than are the slowest buffers.

The adapters 15 described herein are referred to as intelligent adapters. Each adapter is made up of one or more microprocessors, sufficient memory and the microcode appropriate for the functions described below. The memory can be partitioned either physically or logically into input and output buffer spaces.

Each buffer can enqueue data received into its input and output buffers, either physically or logically. In addition, each adapter can retrieve the enqueued data from the respective buffers for placement onto the bus (in the case of an input buffer) or for passing onto the adapter's LAN (in the case of an output buffer). In addition, each adapter can manipulate header data to determine the target or destination LAN of a block of data that the adapter has received into its input buffer. For example, if adapter #1 receives data from its LAN for transmission over the bus to LAN 2, then the adapter #1 would determine that the output buffer of adapter #2 was the target for this particular block of data. Each adapter #i maintains a target register $R_i$ to maintain this information. Each target register $R_i$ has n bits, one bit for each adapter. Each register $R_i$ is a register of n flip-flops. (For simplicity, the target register is shown as having n-bits, even though bit $R_1(1)$ for adapter #1, $R_2(2)$ for adapter #2 and so on designate the output buffers in the same adapters #1, #2 and so on. It is unlikely that an adapter would send data from its input buffer to its output buffer over the bus).

Each adapter 15 also maintains one or more control lines that communicate with the central arbiter 17. The control lines advise central arbiter 17 of the capacity of the input and output buffers 19, 21 of an adapter and also the targeted output buffers for the data in the input buffer of a particular adapter. Specifically, each adapter #i has the following control lines: $T_I(i)$, $T_O(i)$, $F_i$ and $U_i$. The control line $T_I(i)$, when active, indicates that the input buffer of adapter #1 has exceeded a predefined threshold and is in danger of overflowing. Thus, if $T_I(1)$ is high, this indicates that the input buffer of adapter #1 is nearly full. If the input buffer is not allowed to empty some of its data onto the bus, then any additional data from LAN 1 going into the input buffer of adapter #1 would probably result in losing some data, because the input buffer is filled beyond its capacity. If control line $T_0(i)$ is active, then this indicates that the output buffer of adapter #i has exceeded a predefined threshold and is in danger of going empty. Thus, if $T_0(1)$ is high, then the output buffer of adapter #1 is almost empty. If control line $F_i$ is active, then this indicates that the output buffer of adapter #i is full and unable to receive data. Therefore, no data should be sent to it.

Line $U_i$ serially transmits to the central arbiter 17 the contents of the adapter's target register $R_i$. The central arbiter has a corresponding register R for each adapter. Each central arbiter register R is made up of n flip-flops. Thus, line $U_i$ updates the central arbiter with changes in the adapter's register.

Figure 6:
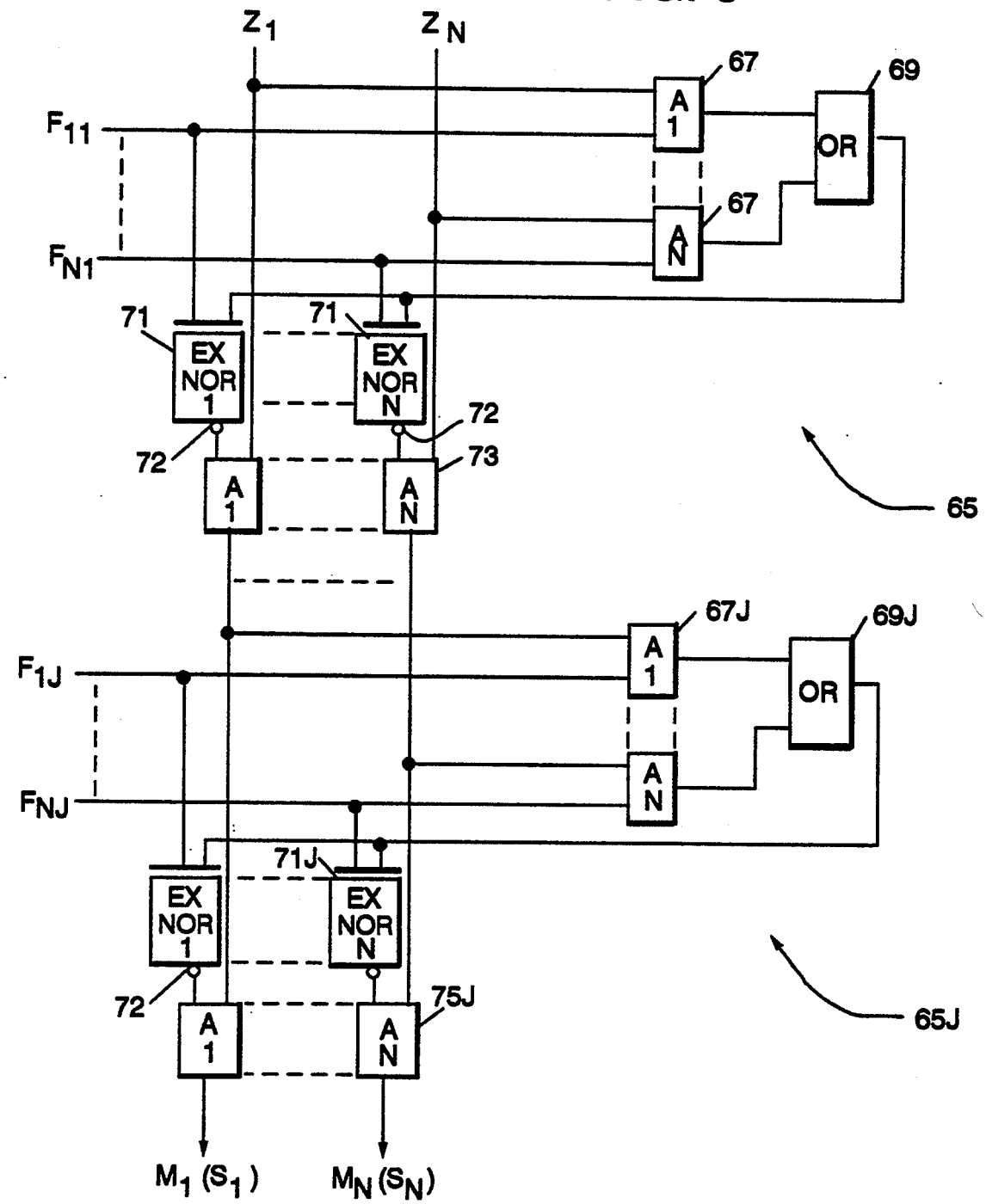
FIG. 6 is a logic circuit of a buffer arbiter.
Figure 7A:
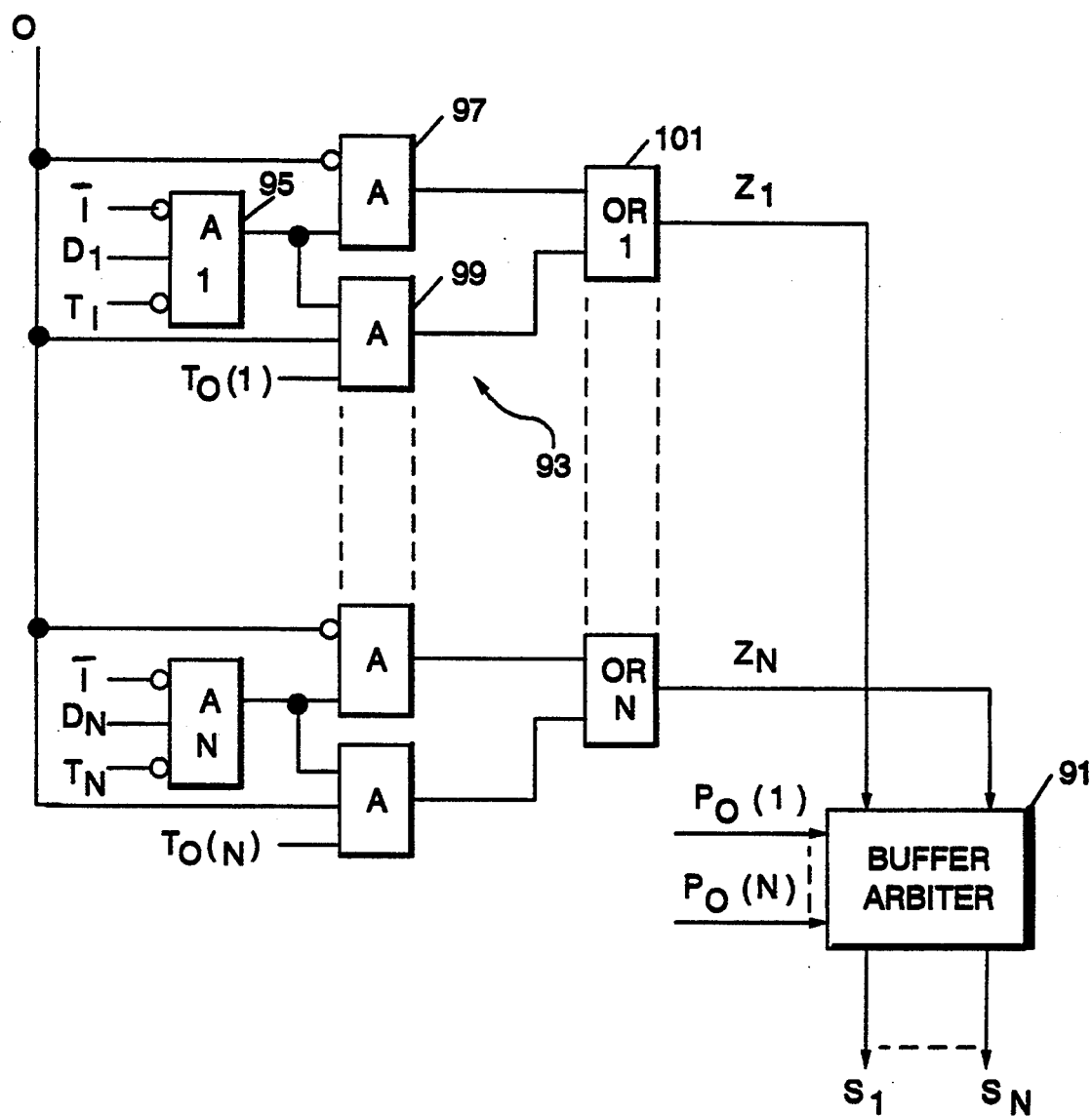
FIGS. 7A and 7B are diagrams showing logic circuits for when I equals 0 (indicating that no nearly full input buffer with data for a non-full output buffer exists).
Figure 7B:
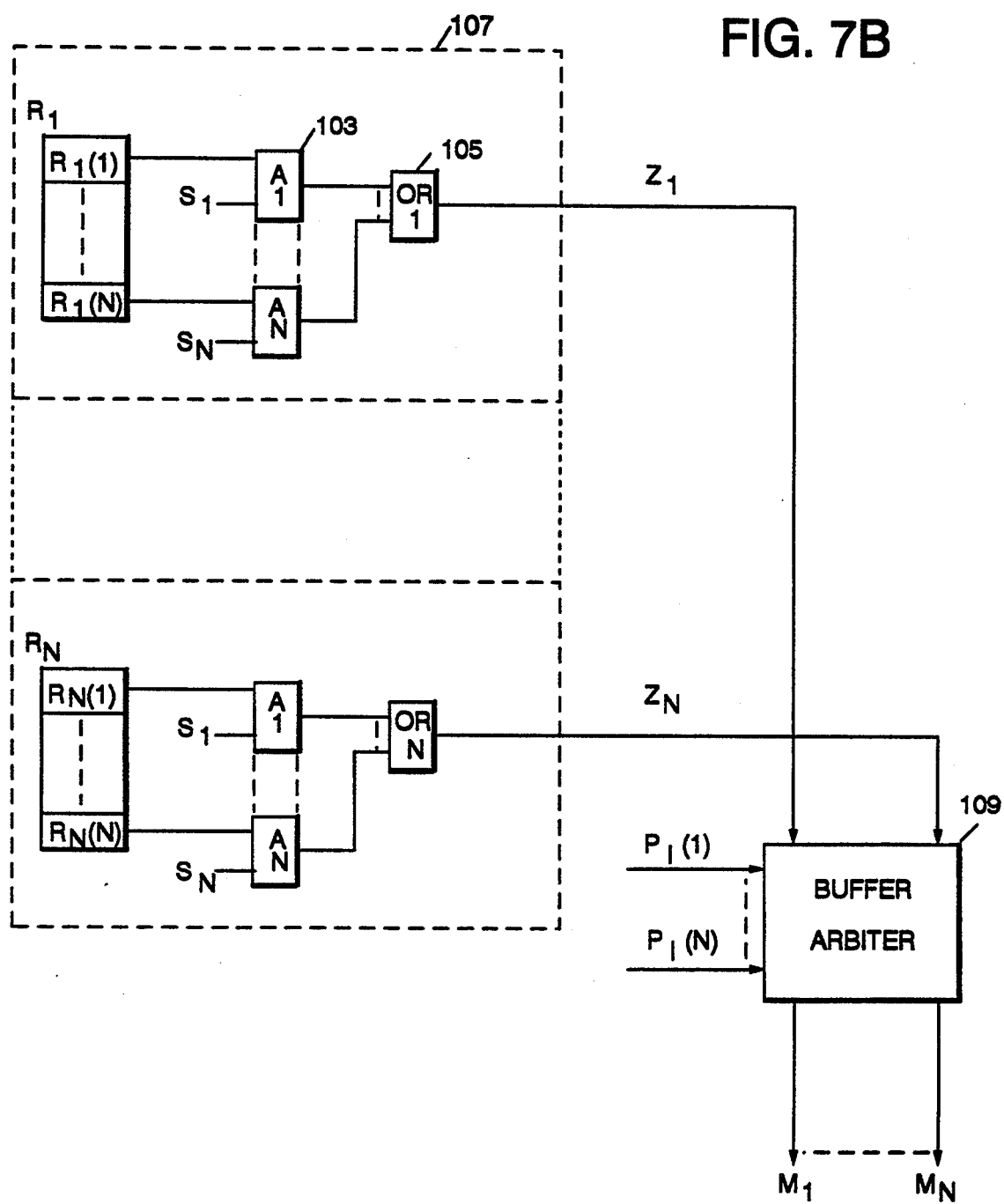
Figure 8:
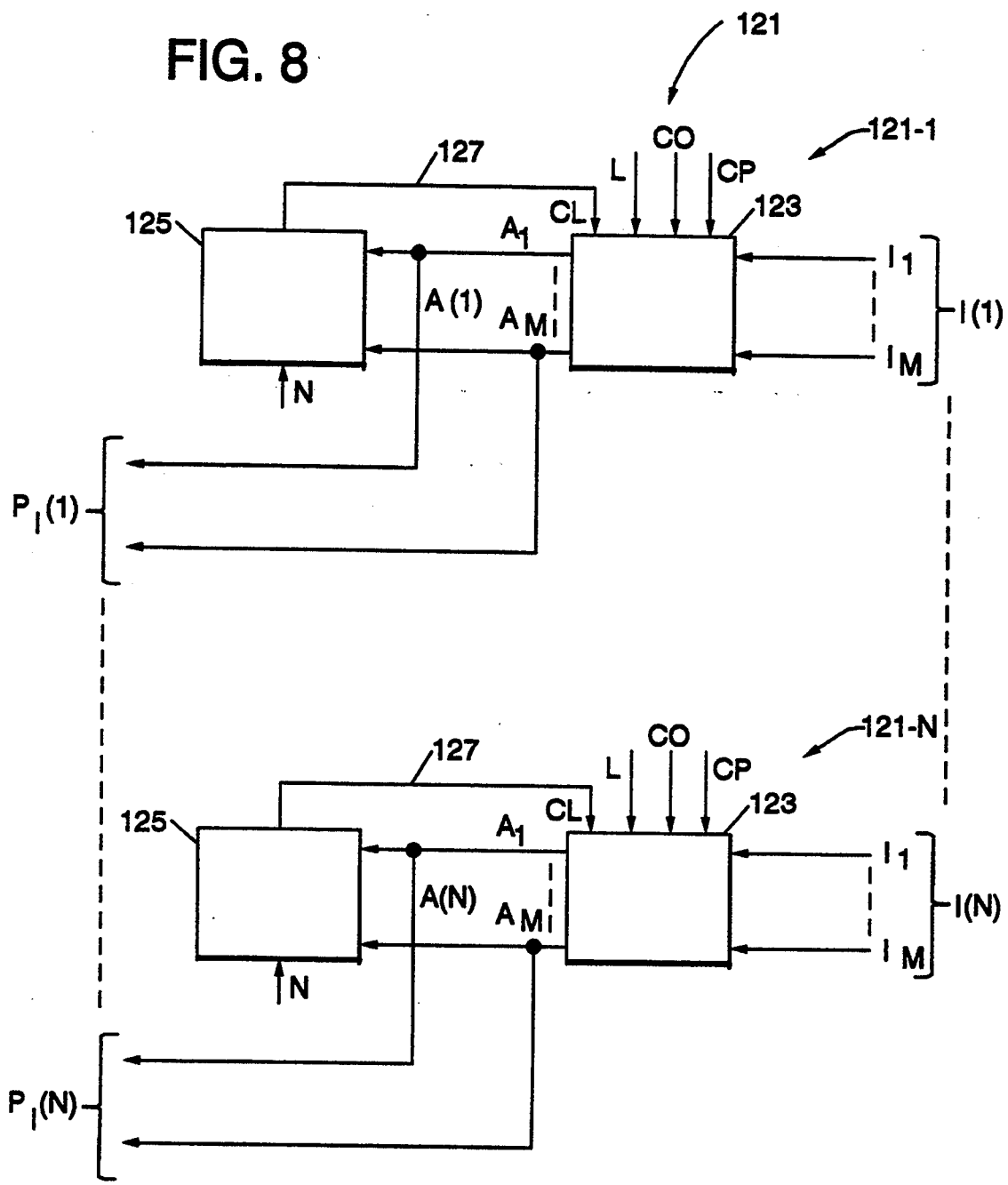
FIG. 8 is a block diagram showing the individual priority generators located within the central arbiter.

The central arbiter 17 includes, in addition to the registers $R_i$, circuits for updating the central arbiter registers (FIG. 3), circuits for producing various control lines (FIGS. 4A–4E), circuits for selecting the transmitting adapter (FIGS. 5A and 7B), circuits for selecting the receiving adapter (FIGS. 5B and 7A), a buffer arbiter (FIG. 6) for each selection circuit of FIGS. 5A, 5B, 7A and 7B and priority generators for each LAN (FIG. 8).

Figure 3:
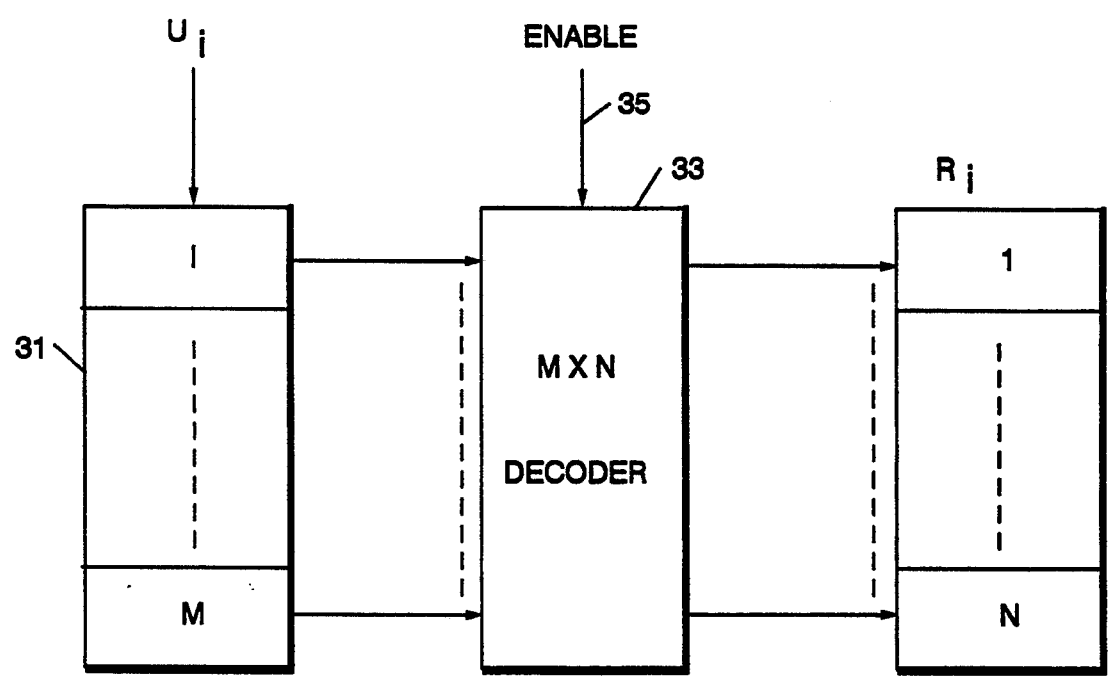
FIG. 3 is a block diagram showing the logic circuit for updating the register $R_i$ in the central arbiter.

In FIG. 3, there is shown a block diagram showing the central arbiter logic for updating register $R_i$ in the central arbiter. Control line $U_i$ is a binary serial line that is connected to the input of an m-bit shift register 31, where m=log 2(n) rounded up to the nearest integer. The m-bit outputs of the shift register are connected to the m-bit inputs of an m×n decoder 33. The decoder 33 also has an enable input 35. The n outputs of the decoder 33 are connected to the n-bits of the shift register $R_i$.

To illustrate the operation of this logic circuit of FIG. 3, suppose that adapter #i received a packet of data for adapter #3 for the first time (that is, the central arbiter register $R_i(3)=0$ up to that point. Adapter #i would serially transmit binary 3 (011) along line $U_i$ to the central arbiter, wherein it would be stored in the shift register 31. This information is passed on as m to the decoder 33, wherein the decoder output line #3 flips $R_i(3)$ from 0 to 1. If the adapter #i has transmitted the last packet of data it had for adapter #3, then the same sequence of events would flip $R_i(3)$ from 1 to 0.

Each adapter is also connected to the central arbiter by way of lines $M_i$ and $S_i$. Line $M_i$ is used by the central arbiter to inform adapter #i that it is to be the transmitter of data on the bus during the next bus transaction. Line $S_i$ is used by the central arbiter to inform adapter #i that it is to be the receiver of data from the bus during the next bus transaction.

Although the control lines $T_I(i)$, $T_O(i)$, $F_i$, $U_i$, $M_i$ and $S_i$ have been shown as discrete lines, the number of lines could be reduced by using serial buses between the respective adapters and the central arbiter. The serial buses would transmit the control information between the adapters and the central arbiter. For example, information equivalent to that conveyed by $T_I(i)$, $T_O(i)$ and $F_i$ would all be transmitted serially along a single line using a binary code, with the required encoding and decoding logic at either end. Similarly, information equivalent to $M_i$ and $S_i$ could be transmitted along a serial bus connected to all of the adapters. Given appropriate codes for start and end of transmission, and other necessary information, the first burst of data would indicate the number of the adapter which is to serve as the next transmitter, while the second burst would indicate the number of the adapter which is to serve as the next receiver.

Whichever arrangement is used, discrete control lines or serial buses, the communication pathway is independent of the bus 11. The serial transmissions on the control lines occur simultaneously and asynchronously to activity on the shared bus, thereby minimizing the impact on bus performance.

Figure 4A:
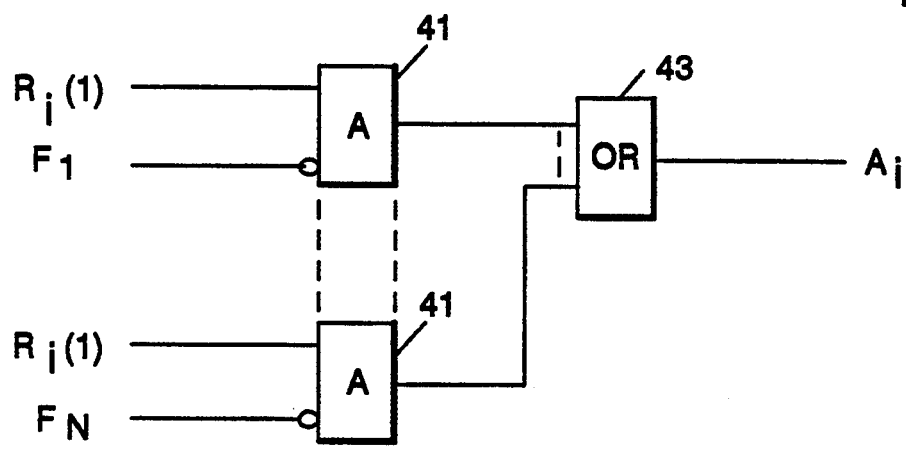
FIGS. 4A–4E are diagrams showing logic circuits for generating control lines in the central arbiter.

The central arbiter 17, besides containing the registers $R_i$ which are updated by the adapters over lines $U_i$, contains logical circuits for controlling which adapters have access to the bus. In FIGS. 4A–4E, there are shown logic circuits for generating additional control lines from the control lines provided by the adapters. In FIG. 4A, a control line $A_i$ is generated from the central arbiter register $R_i$ for adapter #i and from adapter lines $F_1$ through $F_n$. When line $A_i$ is active, it indicates that adapter #i has data in its input buffer (indicated by $R_i$) for at least one non-full output buffer (indicated by lines $F_1$ to $F_n$). As shown in FIG. 4A, there are provided n AND gates 41, one gate for each bit of register $R_i$. Each AND gate 41 has two inputs, namely a respective jth bit of register $R_i$ and the corresponding line $F_j$, which is inverted. The outputs of all of the AND gates 41 are each connected to a respective input of an OR gate 43. The output of the OR gate 43 is control line $A_i$.

Figure 4B:
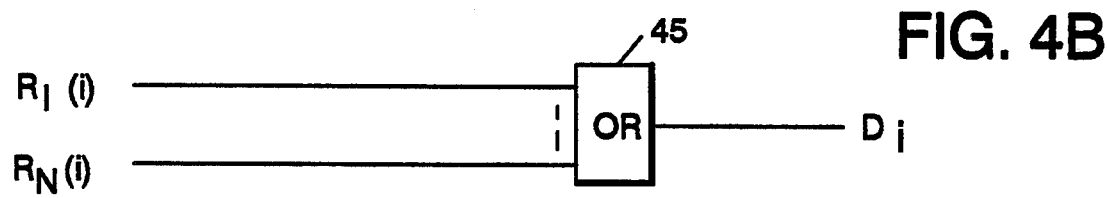

In FIG. 4B, the logic circuit for control line $D_i$ is shown. When line $D_i$ is active, it indicates that data exists in some adapter's input buffer for the output buffer of adapter #i. The ith bit of each of the n registers in the central arbiter is connected to a respective input of an OR gate 45. The output of the OR gate 45 is control line $D_i$.

Figure 4C:
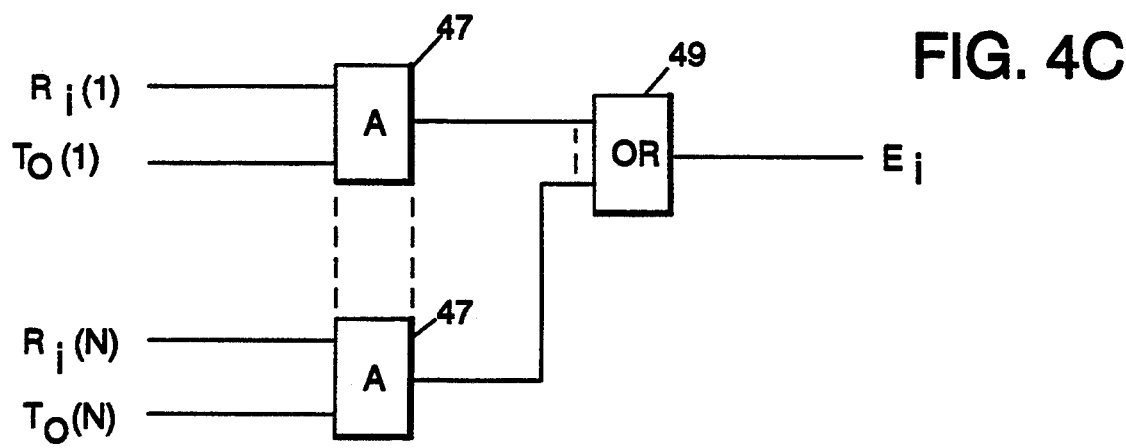

In FIG. 4C, the logic circuit for control line $E_i$ is shown. When line $E_i$ is active, it indicates that adapter #i has data in its input buffer (as indicated by $R_i$) for at least one nearly empty output buffer (as indicated by line $T_0$). There are provided n AND gates 47. Each AND gate 47 has two inputs, namely a respective jth bit of register $R_i$ and the line $T_0(j)$. The outputs from the AND gates 47 are connected to respective inputs of an OR gate 49. The output of the OR gate 49 is line $E_i$.

Figure 4D:
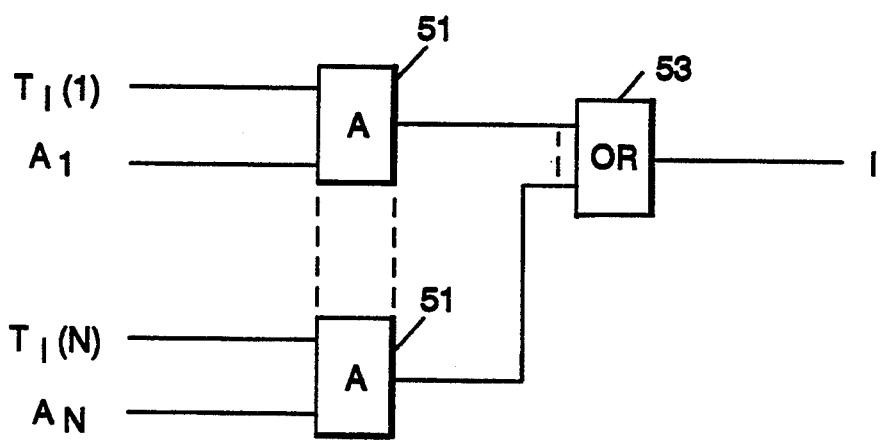

Control lines $A_i$ and $D_i$ are used to generate two more control lines, namely I and O. The logic circuit for control line I is shown in FIG. 4D. When line I is active (that is I=1), it indicates the existence of one nearly full input buffer, with data that can be sent to at least one non-full output buffer ($A_i$ is 1 for some i). There are an n number of AND gates 51. Each AND gate 51 has two inputs, with one input being connected to the control line $T_I(i)$ and the other input being connected to the control line $A_i$. The outputs of the AND gates 51 are connected to respective inputs of an OR gate 53. The output of the OR gate is control line I.

Figure 4E:
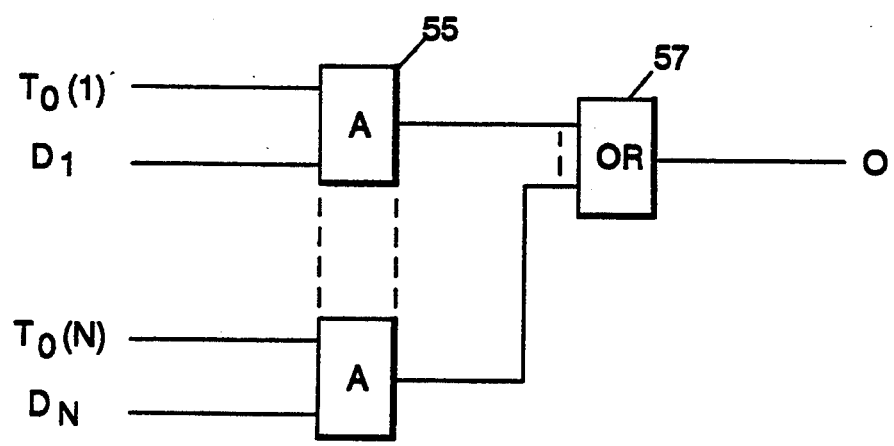

The logic circuit for control line O is shown in FIG. 4E. When line O is active, it indicates the existence of at least one nearly empty output buffer, for which data exists in the input buffer of at least one other adapter ($D_i$ is 1 for some i). There are an n number of AND gates 55. One input of each AND gate 55 is connected to the control line $T_O(i)$ and the other input is connected to the control line $D_i$. The outputs of the AND gates are connected to respective inputs of an OR gate 57. The output of the OR gate is control line O.

Figure 5A:
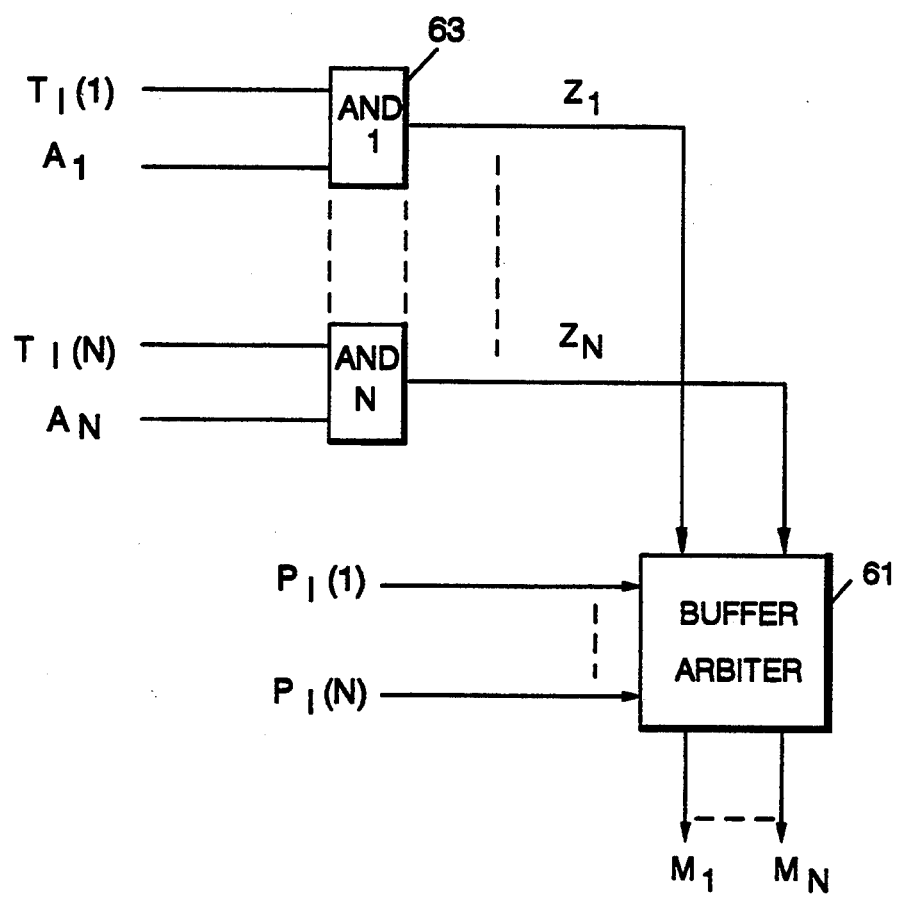
FIGS. 5A and 5B are diagrams showing logic circuits for when I equals 1 (indicating that at least one nearly full input buffer exists, with data for a non-full output buffer).
Figure 5B:
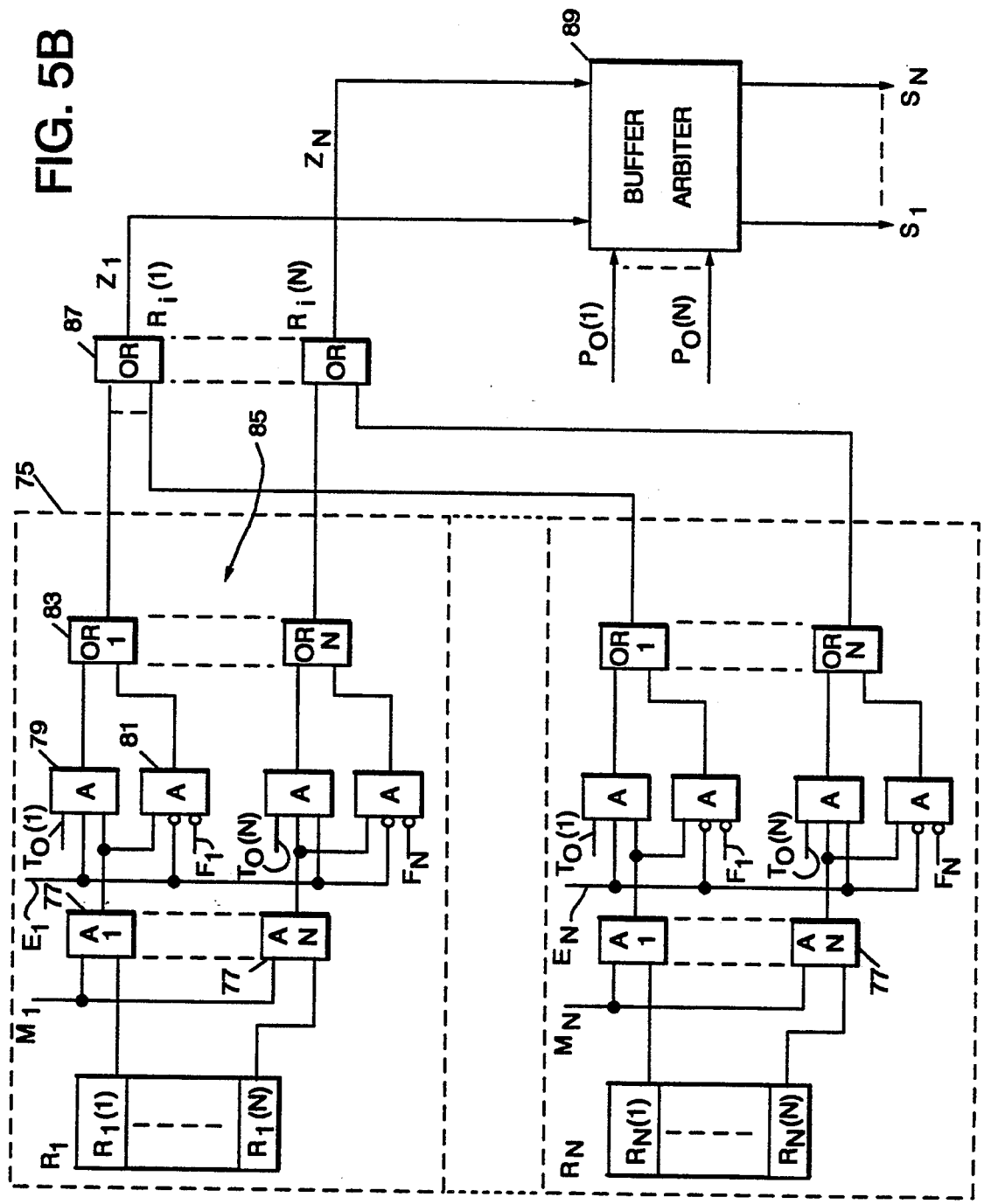

The control lines are routed to various logic circuits inside of the central arbiter 17, which circuits define the transmitter and receiver adapters. If control line I=1 (indicating that there is at least one nearly full input buffer with data that it can send to at least one non-full output buffer), then the logic circuits of FIGS. 5A and 5B are used. If control line I=0 (indicating that there is no nearly full input buffer having data that it can send to at least one non-full output buffer), then the logic circuits of FIGS. 7A and 7B are used.

First, the logic circuits of FIGS. 5A and 5B will be described. These circuits are used when there is an input buffer that is nearly full and in danger of losing data. The logic circuit shown in FIG. 5A defines the transmitter adapter (the input buffer) by setting output $M_i=1$. If there are two or more nearly full input buffers, then a first buffer arbiter 61 determines which nearly full input buffer (and its adapter) gains access to the bus first. After the transmitter adapter is defined, then the receiver adapter (by way of its output buffer) is defined by setting $S_i=1$, with the logic circuit of FIG. 5B. The receiver adapter is selected by determining if there exists a nearly empty output buffer. If there are none, then the circuit determines if there is a non full output buffer. If there are two or more nearly empty output buffers or if there are two or more not full output buffers, then a second buffer arbiter 89 determines which output buffer gains access to the bus first.

The circuit of FIG. 5A provides two sets of inputs to the first buffer arbiter 61. The first set of inputs, denoted $Z_1$ through $Z_n$ are provided by an n number of AND gates 63. The ith AND gate 63 has one input connected to control line $T_I(i)$ and another input connected to control $A_i$. The output is $Z_i$. The second set of inputs to the first buffer arbiter 61, denoted $P_I(1)$ through $P_I(n)$, are lines that program the first buffer arbiter with the desired priority for the transmitter adapter. The inputs $P_I(i)$ are vectors, each of which is made up of lines $P_{ij}$, where j is the jth bit of the priority for adapter #i (binary encoded). For example, if there are 8 adapters, then each vector $P_I(i)$ will have 3 lines. Adapter #1 has lines $P_{11}$, $P_{12}$ and $P_{13}$, adapter #2 has lines $P_{21}$, $P_{22}$ and $P_{23}$ and so on.

Inputs $P_I(i)$ are programmed to select which adapter is to have priority. For example, if adapter #1 has buffer arbiter, then its input $P_I(1)=111$ in binary numbers, and if adapter #2 has second buffer arbiter, its input $P_I(2)=110$ and so on. The inputs $P_I(n)$ can be static, wherein they are preprogrammed by tying the lines to the desired voltages, or the inputs can be dynamic, wherein the priorities for the adapters change over time.

Referring to FIG. 6, the first buffer arbiter 61 will be discussed. There are provided j stages 65 . . . 65J. Each stage 65 has AND gates 67, the outputs of which are all connected to the inputs of an OR gate 69. The first stage 65 determines priorities between the most significant bit of the inputs $P_I(i)$, and so on with the jth stage 65J determining priorities between the least significant bit of the inputs $P_I(i)$. In each stage, there are provided n AND gates 67, one for each adapter. The ith AND gate has one input connected to a respective input $Z_i$, and the other input connected to line $P_{ij}$, where j is the stage 65 and i is the adapter #i. Thus, for example, the first AND gate of the first stage has inputs connected to $Z_i$ and $P_{11}$. The outputs of the AND gates 67 are connected to respective inputs of the OR gate 69. Each stage also has n EXCLUSIVE OR gates 71. The output of the OR gate 69 is connected to one input of each EXCLUSIVE OR gate 71. The other input of the ith EXCLUSIVE OR gate is connected to line $P_{ij}$. Thus, the first EXCLUSIVE OR gate in the first stage has an input of $P_{11}$. The output of each EXCLUSIVE OR gate 71 is inverted 72 and is connected to an input of an AND gate 73. There are an n number of AND gates 73. In the first stage, the other input of the ith AND gate 73 is connected to input $Z_i$. In the second, third and so on stages, the other input of the ith AND gate 73A is connected to the output of the ith AND gate from the previous stage. The outputs of the AND gates 65J in the last stage of the buffer arbiter are $M_1$ through $M_n$.

These lines, $M_1$ through $M_n$ are input into the logic circuit of FIG. 5B. This circuit defines the receiver adapter. For each adapter, there is provided a circuit 75 shown enclosed in a box formed by dashed lines. Thus, there are n circuits 75. Each circuit has n first stage AND gates 77, 2n second stage AND gates 79, 81 and n OR gates 83. An output buffer is selected by a subcircuit 85 which includes an AND gate 77, an AND gate 79, an AND gate 81 and an OR gate 83. Thus, there are an n number of such subcircuits 85 in each circuit 75. Of the possible n adapters, an ith adapter will be selected as the receiving adapter. Each circuit 75 has an ith subcircuit 85. For the selected transmitter adapter, denoted as adapter #h, all of the first stage AND gates 77 of the hth circuit 75 have one input connected to line $M_h$ from FIG. 5A. In the ith subcircuit 85 of the hth circuit 75, the first stage AND gate 77 has its other input connected to a respective ith bit of register $R_h$. There are two second stage AND gates 79, 81. The "nearly empty" AND gate 79 has the following inputs: line $T_O(i)$, $E_h$, and the output of the first stage AND gate 77. The "not full" AND gate 81 has the following inputs: the output of the first stage AND gate 77, an inverted input from line $E_h$, and an inverted input from line $F_h$. The outputs from the second AND gates 79, 81 are connected to the inputs of the respective OR gate 83. The outputs of all of the OR gates 83 in the ith subcircuits 85 (for the output buffer of adapter #i) are connected to inputs into an OR gate 87, which produces an output $Z_i$.

Lines $Z_i$ through $Z_n$ are input into the second buffer arbiter 89, which is identical to the first buffer arbiter 61 described above. Vector inputs $P_0(1)$ through $P_0(n)$ are provided to the second buffer arbiter 89. These vector inputs are configured in the same manner as the vector inputs $P_I(1)$ through $P_I(n)$ in FIG. 5A, so as to provide which output buffer receives priority over the other output buffers. The outputs of the second buffer arbiter 89 are control lines $S_1$ through $S_n$. These control lines determine which adapter is the receiver adapter for the next block of data on the bus 11.

Referring now to FIGS. 7A and 7B, the logic circuits used for I=0 will be described. The circuit of FIG. 7A is used to find the receiver adapter. The circuit gives priority to adapters with nearly empty output buffers, followed by adapters with not full output buffers. Its outputs are used in the circuit of FIG. 7B to define the transmitter adapter. A transmitter adapter is selected by virtue of its having data for the selected receiving adapter.

The circuit of FIG. 7A uses a third buffer arbiter 91, which is identical to the first buffer arbiter generator 61. The inputs $P_O(1)$ through $P_O(n)$ are vectors and are the same as the inputs $P_O(1)$ through $P_O(n)$ of FIG. 5B. Inputs $Z_1$ through $Z_n$ are respectively provided by n logic circuits 93, each of which is made up of a first stage AND gate 95, two second stage AND gates 97, 99 and a third stage OR gate 101. The first stage AND gates 95 each have the following inputs for the hth output buffer: an inverted I, a $D_h$ and an inverted $F_h$. The "full" second stage AND gate 97 has inputs of an inverted O and the output of the first stage AND gate 95. The "nearly empty" AND gate 99 has inputs of the output of the first stage AND gate 95, the line O and $T_O(h)$. The outputs of the second stage AND gates 97, 99 are connected to the inputs of the OR gate 101. The output of the OR gate is line $Z_h$.

The output of the third buffer arbiter 91 is $S_1$ through $S_n$, which are input into AND gates 103 of FIG. 7B. The circuit of FIG. 7B defines a transmitter adapter, based on the output buffer selected in FIG. 7A. FIG. 7B shows a logic circuit 107 for each transmitter adapter enclosed in a box formed by dashed lines. Thus, there are n circuits 107. Each circuit 107 is connected to a register. Thus, the circuit 107 of the hth transmitting adapter is connected to register $R_h$. Each circuit has n AND gates 103. The ith AND gate 103 has inputs connected to $S_i$ and $R_h(i)$, for the input buffer of the hth adapter. The outputs of all of the AND gates 103 are connected to the inputs of an OR gate 105. The output of the OR gate 105 is line $Z_h$. Lines $Z_1$ through $Z_n$ are connected to the fourth buffer arbiter 109, which is identical to the first buffer arbiter 61. The fourth buffer arbiter 109 has vector inputs $P_I(1)$ through $P_I(n)$, which are the same inputs described in FIG. 5A.

The operation of the preferred embodiment will now be described. During the operation of the data processing system, each adapter 15 receives data in its input buffer from its attached resource. The data is intended for one or more resources on the bus. The adapter is able to retrieve the data intended for a specific resource from all of the data in its input buffer. Likewise, the adapter is able to determine the targeted resources for the data on its input buffer. Each adapter is granted access to the bus for transmitting some of this data by the central arbiter 17. Each adapter receives data targeted to it from the bus and into its output buffer. Access to the bus is granted by the central arbiter 17. Data from the output buffer is output to the respective resource.

For simplicity, a uniform block size of data transmitted across the bus is used. This simplifies computations for the thresholds in determining $T_I(i)$ and $T_O(i)$, as well as the optimal data block size transferred across the bus with each access.

To determine which adapter should transmit over the bus and which adapter should receive from the bus, the central arbiter determines if any adapter has a nearly full input buffer and if so if that nearly full input buffer is targeted for any output buffer that is either neither empty or not full. This information is obtained over the control lines $T_I(i)$, $T_O(i)$ and $F_i$. An adapter with an input buffer that is nearly full of data targeted for one or more non-full output buffers is given the buffer arbiter in accessing the bus in order to prevent the input buffer from overflowing and the consequent loss of data. For example, if adapter #1 has a nearly full input buffer, then it sets its line $T_I(1)$ high. If adapter #1 has data for adapter #2, then its register indicates this by setting $R_1(2)$ to 1. If adapter #2 has a non-full output buffer, it sets its line $F_2$ low. The circuit of FIG. 4A produces $A_1=1$, because $R_1(2)=1$ and inverted $F_2=1$. This is used in the circuit of FIG. 4D to produce I=1, because $T_I(1)=1$ and $A_1=1$.

If adapter #1 has data in its input buffer for only output buffers that are full, so that $F_i=1$ causing $A_1=0$, then adapter #1 does not gain access to the bus. This is because adapter #1 has no place to transmit its data to. Adapter #1 must wait until a targeted output buffer becomes non-full.

When I=1, the circuit of FIG. 5A is enabled (because $T_I(1)$ and $A_1$ both are 1) and the circuit of FIG. 7A is disabled because the first stage AND gates 95 of FIG. 7A are disabled (by the inverted I input). The following algorithm is used to select the input buffer (transmitting adapter) first and then select the output buffer (receiving adapter). First, activate those input buffer priorities for which $T_I(k)$ and $A_k=1$ (see FIG. 5A). This indicates that the input buffer of adapter #k is nearly full and a non-full output buffer exists for its data. Then, the input buffer with the buffer arbiter is selected. The adapter with this input buffer is adapter #h. Next, if $E_h=1$ (that is the input buffer of adapter #h has data for a nearly empty output buffer), then activate those output buffer priorities for which $(R_h(i)$ and $T_0(i))=1$. $R_h(i)=1$ implies that the input buffer of adapter #h has data for the output buffer of adapter #i. If $E_h=0$, then activate those output buffer priorities for which $(R_h(i)$ and (not $F_i))=1$. (Not $F_i)=1$ implies that the output buffer of adapter #i is not full. Finally, select the output buffer with the buffer arbiter.

For example, suppose that the non-full output buffer of adapter #2 is targeted by the input buffer of adapter #1, then the circuits of FIGS. 5A and 5B are used because I=1. Because $T_I(1)=1$ and $A_1=1$, then in FIG. 5A, line $Z_1$ is high or 1. If no other adapter has a nearly full input buffer, then the output of the first buffer arbiter generator 61 is $M_1=1$, thereby defining adapter #1 as the transmitter adapter. This enables the circuit 75 for adapter #1 (which controls register $R_1$) in FIG. 5B, because the first stage AND gates 77 are enabled.

However, if another adapter has a nearly full input buffer with data targeted for non-full output buffers, then the first buffer arbiter 61 determines which adapter is a transmitting adapter. For example, if, in addition to adapter #1, adapter #3 has a nearly full input buffer, then both lines $Z_1$ and $Z_3$ are high into the first buffer arbiter 61. The first buffer arbiter determines whether adapter #1 or adapter #3 has the higher priority, using the vector inputs $P_I(1)$ and $P_I(3)$. Suppose adapter #1 has a priority of $P_I(1)=111$ and adapter #3 has a lower priority of $P_I(3)=101$. Referring to FIG. 6, the first stage EXCLUSIVE OR gates 71 filter out the zeros in the most significant bit of the inputs $P_I(1)$ and $P_I(3)$. Since the most significant bits are both 1's, then the first stage has a tie. The output of the first and third EXCLUSIVE OR gates 73 is passed on to the second stage, which compares the intermediate bit. Here, $P_I(1)$ wins because it has a 1, while $P_I(3)$ has a 0. Thus, the output of the first EXCLUSIVE OR gate is 1 and is passed onto the third stage, while the output of the third EXCLUSIVE OR gate is 0 and is blocked from the third stage. The outputs of the arbiter 61 are $M_1=1$ and all the other outputs are 0.

In FIG. 5B, the circuit 107 for adapter #1 is enabled. The first stage AND gate 77 determines which output buffers are targeted by adapter #1. Because $R_1(2)=1$, then the subcircuit 85 for adapter #2 is enabled. The second stage AND gates 79, 81 determine if any of the targeted output buffers are nearly empty. If so, $E_1=1$, thereby disabling the gate circuits of any output buffers that are merely not full. $E_1=1$ because, using the circuit of FIG. 4C, $R_1(2)=1$ and $T_0(2)=1$. Thus, the nearly empty AND gate 79 produces a high output, wherein line $Z_1$ into the second buffer arbiter 89 is high. If not other adapter has a nearly empty output buffer, then the second buffer arbiter produces $S_2=1$, thereby defining adapter #2 as the receiver adapter.

However, if, for example, adapter #3 has a newly empty output buffer and is targeted by the input buffer of adapter #1, then the line $Z_3$ into the second buffer arbiter 89 is high. The second buffer arbiter determines whether adapter #2 or adapter #3 has the higher priority, using vector inputs $P_O(2)$ and $P_O(3)$. If adapter #2 has the higher priority of the two, then $S_2=1$ and all other S outputs from the generator 89 are 0.

If any of the output buffers targeted by the input buffer of adapter #1 are not full, as opposed to being nearly empty, then the "not full" AND gates 81 are enabled. This is because the inverse of $E_i=1$ and the inverse of $F_i=1$. Selection of not full output buffers is thus allowed.

Thus, using the circuits of FIGS. 5A and 5B, the central arbiter controls the adapters having access to the bus for the next transfer of data across the bus. The adapters having nearly full input buffers that are targeted for adapters with non-full output buffers are given the buffer arbiter. First, the transmitter adapter with the buffer arbiter is defined. Once the transmitter adapter is defined, then the receiver adapter is defined from those output buffers which are targeted by the transmitter adapter. Those output buffers that are nearly empty are given higher priority over those output buffers that are not full.

If there are no adapters with a nearly full input buffer, then $I=0$ and the circuits of FIGS. 7A and 7B are used. The following algorithm is used to select the output buffer first and then to select the input buffer. First, if $O=1$ (that is a nearly empty output buffer exists for which there is data in some adapter's input buffer), then activate those output buffer priorities for which ($T_O(k)$ and $D_k)=1$. $D_k=1$ implies that data exists for the output buffer of adapter #k in at least one other adapter. Otherwise, activate those output buffer priorities for which $(D_k$ and (not $F_k))=1$ (that is, all that are not full). Then, select the output buffer with the buffer arbiter. Let this be adapter #h. Next, activate those input buffer priorities for which $R_i(h)=1$. Only the hth bit of every target register is examined. Finally, select the input buffer with the highest activated priority.

For example, suppose that adapter #2 has a nearly empty output buffer. The central arbiter 17 determines if there is another adapter with data targeted for the output buffer of adapter #2. Supposing that the input buffer of adapter #1 has data targeted for adapter #2, $O=1$. This is because, using the circuit of FIG. 4B, $R_1(2)=1$ to produce $D_2=2$. Using the circuit of FIG. 4E, $T_O(2)=1$ (the output buffer of adapter #2 is nearly empty) and $D_2=1$ to produce $O=1$. With $O=1$, the "nearly empty" AND gates 99 of FIG. 7A are all enabled and the "not full" AND gates 97 are all disabled. The other inputs into the AND gate 99 for the output buffer of adapter #2 are all 1, because $T_O(2)=1$ and the output of the first stage AND gate 95 is 1 (due to ((not I) and $D_2$ and (not $F_2$))=1). This produces an input on line $Z_2$ into the third buffer arbiter 91.

If there are two or more adapters that have active Z lines into the third buffer arbiter 91, then the adapter with the buffer arbiter is selected by the third buffer arbiter 91. For example, if adapter #3 has a nearly empty output buffer, for which data exists, then input vectors $P_O(2)$ and $P_O(3)$ are compared by the third buffer arbiter generator 91. The third buffer arbiter 91 produces an output $S_h$. If adapter #2 has the buffer arbiter, then $S_2=1$.

This output of the third buffer arbiter 91 enables all of the AND gates 103 relating to adapter #2 in the circuit of FIG. 7B. Any adapter #i having data for the output buffer of adapter #2 has its register set, $R_i(2)=1$. Thus, if adapter #1 has data for adapter #2, $R_1(2)=1$. This causes line $Z_1$ to go high. If no other adapters have data for adapter #2, then the output of the fourth buffer arbiter 109 is $M_1=1$ and all other $M_i$ outputs are 0. If other adapters have data for adapter #2, such as adapter #3, then the fourth buffer arbiter 109 compares input vectors $P_I(1)$ and $P_I(3)$, which are the same as in FIG. 5A. If adapter #1 has a higher priority, then the fourth buffer arbiter 109 produces $M_1=1$.

The central arbiter 17 works in the background of the bus 11, both physically and temporally. The central arbiter receives and sends information to and from the adapters over control lines that are separate from the bus 11. Furthermore, the central arbiter determines which adapters will access the bus at the same time that data is being transmitted across the bus.

Data is transmitted onto the bus in block sizes. For simplicity, the block sizes are uniform. The clock 16 synchronizes all of the adapters and the central arbiter. Thus, for example, during a first bus cycle, adapter #1 transmits a block of data across the bus to adapter #2. In addition, during the first bus cycle, the central arbiter determines the next set of adapters to have access to the bus for the second bus cycle. For example, for the second bus cycle, the central arbiter determines that adapter #1 will receive a block of data from adapter #3.

An advantage that the present invention has over prior art arbiters is the ability to accommodate the latest information from the adapters. With the present invention, status changes do not disrupt the central arbiter. Suppose, for example, that adapter #1 has data for adapter #2, yet the input buffer of adapter #1 is not yet full during one bus cycle. If no other input buffers are not yet full either, then adapter #1 may not gain access to the bus because of a low priority. However, near the end of the bus cycle, the input buffer of adapter #1 becomes nearly full, activating line $T_i(1)$. Conventional latch circuits can be used to turn the central arbiter 17 on just before the beginning of the next bus cycle. The central arbiter decides bus access with the most current information, thereby giving adapters #1 and 2 access to the bus in order to relieve the nearly full input buffer of adapter #1.

In FIG. 8, there is shown a block diagram of the individual priority generators 121. There are two priority generators for each adapter, namely a priority generator that produces the input buffer priority $P_I$ (for the circuits of FIGS. 5A and 7B) and a priority generator that produces the output buffer priority $P_O$ (for the circuits of FIGS. 5B and 7B). For simplicity, FIG. 8 shows the priority generators for the input buffers only. The output buffers priority generators are identical to those shown in FIG. 8. LAN 1 corresponds to priority generator 121-1; LAN n corresponds to priority generator 121-n. Each priority generator 121 includes a counter 123 and comparator 125.

The counter 123 is a fixed n, modulo n counter, which is conventional and commercially available. The counter has a clear input CL, a load input L, a count input CO, a clock pulse input CP, initial inputs I ($I_1$ through $I_m$) and outputs A ($A_1$ through $A_m$). The initial inputs I allow a signal representative of an initial starting value to be loaded into the respective counter. Thus, for example, if m=3 and $I_1$=0, $I_2$=1 and $I_3$=0 (so that the particular input I=010), then the counter will begin counting from 2, instead of from 0. The load input L, when activated (or high) loads the initial starting value from inputs I into the counter. When the load input L is deactivated (or low), then the values appearing at inputs I are not loaded. The load input L feature allows the inputs I to remain constant, while allowing the counter to accept an initial starting value and then proceed to count from that value.

The clear input CL, when activated, zeros the counter by zeroing the outputs A.. The count input CO, when activated, allows the counter to count upwardly. Thus, when the count input CO is activated or enabled, every time the clock input CP is set, the counter will increment by 1. An output signal representative of the new count value appears at outputs A. For example, if the initial value at inputs I is 010, when the counter counts, the outputs A will change from 010 to 011. The respective inputs L, CO, CP of all of the priority generators are connected together. Thus, all of the load inputs L are connected together. This enables the counters 123 in all of the priority generators to be loaded together using one signal. Likewise, all four count inputs CO are connected together and all four clock pulse inputs CP are connected together.

The outputs A of each counter are connected to the inputs of a respective m-bit binary comparator 125 (MBBC). The comparator 125 also has an input N, which is the desired binary modulo number of the counter. The output 127 of the comparator 125 is connected to the clear input CL of the counter 123. All of the N inputs from all of the four comparators are connected together. The comparator 125 is conventional and commercially available.

The outputs A of the counter 123 also represent the priority number of the particular input buffer 19. These outputs A are provided to the respective buffer arbiters 61, 89, 91, 109. Thus, the output A(1) of the first priority generator 121-1 are the inputs $P_I(1)$ (or inputs $P_O(1)$) to the buffer arbiters. The outputs A(n) of the nth priority generator 121-n are the inputs $P_I(n)$ (or inputs $P_O(n)$) to the buffer arbiters.

The operation of the present invention will now be described. The priority generators 121 of the present invention can be programmed to provide a variety of priority schemes, with the minimal hardware described. The priority generators can provide fixed priority, first-come first-serve priority, round robin priority, and a combination of fixed and round robin priorities.

To provide fixed priority, the inputs I of all of the priority generators are set at different initial starting values. For example, if LAN #4 is to have the highest priority, followed by LAN #3, which is followed by LAN #2, which is followed by LAN #1, then inputs I(4) for the fourth priority generator 121-4 are 011, the inputs I(3) for the third priority generator 121-3 are 010 and so on. (This is with the buffer arbiter of FIG. 6, which grants priority based on the highest priority number. If the buffer arbiter grants priority based on the lowest priority number, then the initial starting values would be reversed so that inputs I for the fourth priority generator 121-4 are 000, the inputs I for the third priority generator 121-3 are 001 and so on.) The respective inputs I are loaded into the respective counter by enabling the load input L. After the initial values I are loaded into each counter, the count input CO of each counter is disabled. This fixes the outputs A at the programmed priorities. To change the priorities between the LANs, the inputs I are reprogrammed to new values, load L is enabled to pass the inputs I to the outputs A and disabled.

To provide for first-come first-serve priority, all of the counters 23 are loaded with the same initial starting values at inputs I. Thus, for example, all of the inputs I into all of the counters would be set at 000. Once these values are loaded into the counters, the count input CO of each counter is disabled to fix the outputs A.

The respective buffer arbiter reads the fixed outputs A from each priority generator. The buffer arbiter can be provided with a queue so that the first LAN to request access to the bus has its request placed at the top of the queue. The buffer arbiter grants bus access for the next bus cycle to whichever LAN is located at the top of the queue.

To provide for a round robin priority, each priority generator is loaded with a unique initial starting value at inputs I, as in the fixed priority scheme. Input N, for each priority generator 121, equals the number of resources on the bus. For example, if there are four LANs sharing the bus, then N=4 (100 in binary). To rotate priorities, the count input CO is enabled and a clock pulse is provided on the CP input of each counter. This causes the output A of each counter to increment. This round robin scheme allows each device to have the highest priority once every four cycles of the priority generators. Round robin will be discussed in more detail below.

The priority generators can be cycled to change outputs A every bus access or every multiple bus accesses, depending on traffic conditions. The priority generators 121 can be used with flow controllers other than what is shown in FIGS. 1–7B. The ability to cycle the priority generators at a selected rate to obtain new outputs A enhances the flexibility of using the priority generators with many types of flow controllers or central arbiters.

The present invention provides a combination of fixed priority and round robin arbitration schemes. To provide a combination of fixed priority and round robin arbitration schemes, each priority generator is loaded with a unique starting value at inputs I. For each priority generator 121, the input N of the comparator 125 is fixed at some value greater than the number of LANs sharing the bus.

An example of this combination of priority schemes will be given with reference to Table 1. There are four resources on the bus. N, the modulo number of the counters, is set to 20. The counters are all cycled by enabling the clock pulse input CP and by providing a pulse on the count input CO. The inputs I are as follows: I(1) (that is of LAN #1) is 1; I(2)=2. I(3)=3 and I(4)=4. These starting values of I are loaded (in binary) into the respective counters by enabling the clock pulse input CP and the load input L.

TABLE 1

| | | Device # | | | |
|---|---|---|---|---|---|
| | | 1 | 2 | 3 | 4 |
| Cycle # | 1 | 1 | 2 | 3 | 4 |
| | 2 | 2 | 3 | 4 | 5 |
| | 3 | 3 | 4 | 5 | 6 |
| | 4 | 4 | 5 | 6 | 7 |
| | 5 | 5 | 6 | 7 | 8 |
| | . | | | | |
| | . | | | | |
| | . | | | | |
| | 13 | 13 | 14 | 15 | 16 |
| | 14 | 14 | 15 | 16 | 17 |
| | 15 | 15 | 16 | 17 | 18 |
| | 16 | 16 | 17 | 18 | 19 |
| | 17 | 17 | 18 | 19 | 0 |
| | 18 | 18 | 19 | 0 | 1 |
| | 19 | 19 | 0 | 1 | 2 |
| | 20 | 0 | 1 | 2 | 3 |
| | 21 | 1 | 2 | 3 | 4 |

The outputs then become A(1)=1, A(2)=2, A(3)=3 and A(4)=4. This is the result of the first cycle as shown in Table 1.

In the second cycle, each counter is incremented by +1 by enabling the clock pulse input CP and the count input CO. The counter 121-1 of LAN #1 changes its output to A(1)=2. Likewise, each of the other counters increment their respective outputs to A(2)=3, A(3)=4 and A(4)=5.

During cycle 1, LAN #4 had the highest priority of 4. LAN #3 was second with a priority of 3, LAN #2 was third with a priority of 2 and LAN #1 was the lowest with the priority of 1. During cycle 2, the relative priorities between the LANs remained fixed. LAN #4 still has the highest priority, LAN #3 is second in priority, LAN #2 is third in priority and LAN #1 is lowest in priority. The relative priorities remained fixed because all of the counters 121 are incremented by adding 1 at the same time.

This fixed priority scheme continues through cycle 16, where LAN #4 still has the highest priority and LAN #1 still has the lowest priority. During cycle 17, the counter 123 in the 4th priority generator 121-4 increments to 20. However, the comparator 125 in the 4th priority generator 121-4 quickly compares the outputs A(4) to N and determines that both are 20. The comparator 125 in priority generator 121-4 sends a signal over the line 127 to the clear input CL. This clears the counter 123 in generator 121-4, causing the output A(4) to become 0.

By unevenly incrementing the counter 123 in the 4th priority generator 121-4 with respect to the other counters (by a −20 increment for the counter 123 in the 4th generator 121-4 versus a +1 increment for the other counters), the relative priorities between the LANs have changed. LAN #4 no longer has highest priority, but instead has lowest priority because A(4)=0. LAN #3 now has highest priority with A(3)=19, LAN #2 is second with A(2)=18 and LAN #1 is third with A(1)=17. In fact, during cycle 17, the priority generators change from a fixed priority scheme to a round robin scheme. The round robin scheme continues through cycle 20. For cycles 17-20, each LAN is given the highest priority for one cycle.

Under the fixed priority scheme of cycles 1-16, LANs 1 and 2 have the lowest and second lowest priorities, respectively. However, by combining a round robin scheme with a fixed priority scheme, LANs 1 and 2 are guaranteed access to the bus for at least some of the time. Thus, the arbitration scheme of the present invention guarantees fairness in accessing the bus, because all resources will have access to the bus.

After cycle 20, the pattern repeats. For example, cycles 21-36 produce a fixed priority scheme while cycles 37-40 produce a round robin scheme.

The amount of guaranteed fairness can be programmed by selecting the value of N relative to the number of devices n. As described above, if N=n, so that in the example, N=4, then a round robin scheme is implemented. If N is increased to some value larger than n, then a fixed priority scheme is implemented for some of the cycles and round robin scheme is implemented for four cycles. For example, if N=8, a round robin scheme will be implemented for four cycles and a fixed priority scheme will also be implemented for four cycles. If N is greater than 2n, then a fixed priority scheme is implemented for more cycles than a round robin scheme. By selecting the value of N, various tradeoffs in a data processing system can be accommodated. The value of N need not be static. N can be dynamically changed if traffic conditions on the bus change, in order to maximize bus performance.

The priority generators 121 can be programmed to change to any of the arbitration policies or schemes described above at any time. The priority generators can change between fixed priority, round robin priority, first-come first-serve priority or a combination of fixed priority and round robin priority. Likewise, if the number of resources sharing the bus changes, the priority generator hardware can remain intact with only a programming change being needed. Furthermore, assignment of priorities is independent of the position of the resources on the bus.

The priority generators of the present invention are accomplished using a minimum amount of hardware, thereby minimizing arbitration overhead. Furthermore, the generation of priorities occurs in the background while the bus is in use. This minimizes adverse affects on system performance.

Although the present invention has been described as using counters that increment in a positive sense, so as to count upwardly (1, 2, 3, etc.), counters that increment in a negative sense (10, 9, 8, etc.) can also be used.

The foregoing disclosure and the showings made in the drawings are merely illustrative of the principles of this invention and are not to be interpreted in a limiting sense.

We claim:

1. A method of generating priorities for plural resources in a data processing system, said plural resources sharing a common device, comprising the steps of:

a) providing for each resource a counter having an input for receiving an input signal representative of a starting value and an output for providing an output signal representative of an incremented value;

b) loading into each of said counters by use of said respective input an input signal representative of a predetermined starting value, said starting value for each of said counters being unique relative to the starting values of said other counters;

c) at predetermined intervals of time, incrementing all of said counters to provide output signals representative of new incremented values and determining the priority of each of said resources from the respective output signals;

d) determining when the output signal of each of said counters becomes representative of a first predetermined value, and upon the determination that the output signal of a respective counter becomes representative of said first predetermined value, then resetting said respective counter so as to produce an output signal representative of a second predetermined value and continuing with incrementing all of said counters at said predetermined intervals of time.

2. The method of claim 1 wherein the step of determining when the output signal of each of said counters becomes representative of said first predetermined value further comprises comparing the output signal of each of said counters to a reference signal.

3. The method of claim 1 further comprising the step of providing that said first predetermined value is representative of a number that is greater than the number of said resources sharing said common device.

4. The method of claim 1 wherein the step of resetting each counter to said output signal representative of said second predetermined value further comprises resetting the output signal of each counter to zero.

5. The method of claim 1 further comprising the step of providing that said first predetermined value is representative of the number of said resources sharing said common device.

6. The method of claim 1 further comprising the step of changing said first predetermined value over time.

7. An apparatus for generating priorities for plural resources in a data processing system, said plural resources sharing a common device, comprising:

a) each resource having a counter that has an input for receiving an input signal representative of a starting value and an output for providing an output signal representative of an incremented priority value;

b) each of said counters having means for incrementing said respective counter to provide a new output signal representative of a new incremented value;

c) each of said counters having means for determining when said output signal becomes representative of a first predetermined value and for producing a reset signal when said output signal becomes representative of said first predetermined value;

d) said respective reset signal being applied to respective means for resetting said respective counters.

8. The apparatus of claim 7 wherein said counter comprises a modulo n counter.

9. The apparatus of claim 8 wherein said means for determining when said output signal becomes representative of said first predetermined value comprises an m-bit binary comparator.

10. The apparatus of claim 7 wherein said means for determining when said output signal becomes representative of said first predetermined value comprises an m-bit binary comparator.

11. The apparatus of claim 7 wherein said counter comprises a fixed n modulo n counter.

* * * * *